(No Model.)

W. R. PATTERSON.
SPLICE FOR TELEGRAPH CABLES.

No. 277,335. Patented May 8, 1883.

Attest
Paul A. Staley
J. A. McKamy

Inventor
William R. Patterson
By George R. Barton
Attorney

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

SPLICE FOR TELEGRAPH-CABLES.

SPECIFICATION forming part of Letters Patent No. 277,335, dated May 8, 1883.

Application filed November 13, 1882. (No model.)

*To all whom it may concern:*

Be it known that I, WILLIAM R. PATTERSON, a citizen of the United States, residing at Chicago, in the county of Cook and State of Illinois, have invented a certain new and useful Improvement in Splices for Telegraph-Cables, of which the following is a full, clear, concise, and exact description, reference being had to the accompanying drawings, forming a part of this specification.

My invention relates to splicing the lead pipe and conducting-wires of underground-telegraph cables; and it consists in a metallic covering of considerable length placed about the pipe of the cable and extending in either direction from the joint, in combination with an insulating substance, as hereinafter described and claimed. The extreme end of the covering should be of lead. The central portion of the covering is a T-shaped piece, and is adapted to receive the sleeves and cap of the covering. The inner sections of the sleeves should be of harder metal than lead. I prefer brass. The brass and lead sections of the different sleeves are conveniently joined by ordinary wipe-joints. After the sleeves are screwed into the T-piece, which is preferably an iron casting, the extreme ends of the sleeves are united with the lead pipe of the cable by ordinary wipe-joints. The metallic covering thus formed is then filled with melted paraffine or other insulating substance, which becomes solid, like paraffine, when allowed to cool. The joints of the wires are thus protected from moisture and external injury by the metallic covering filled with paraffine or other wax.

Figure 1:
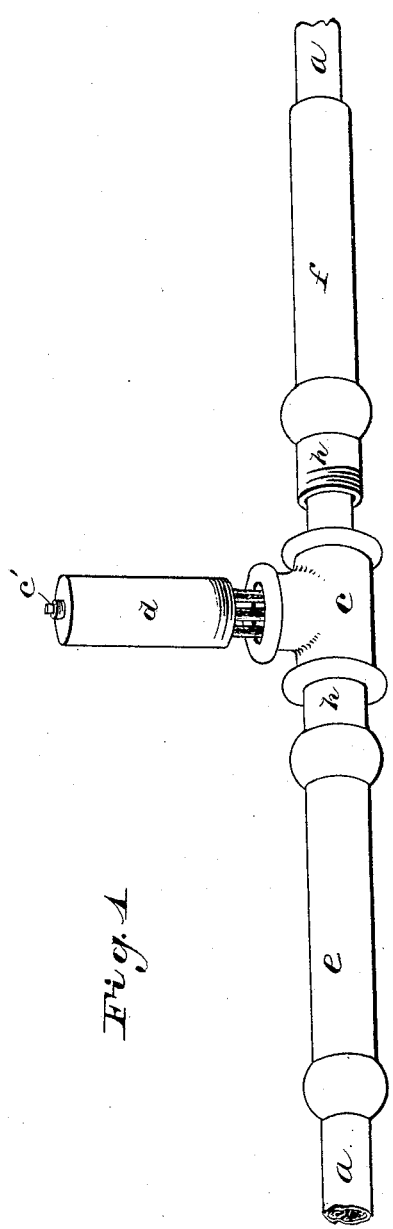
Figure 2:
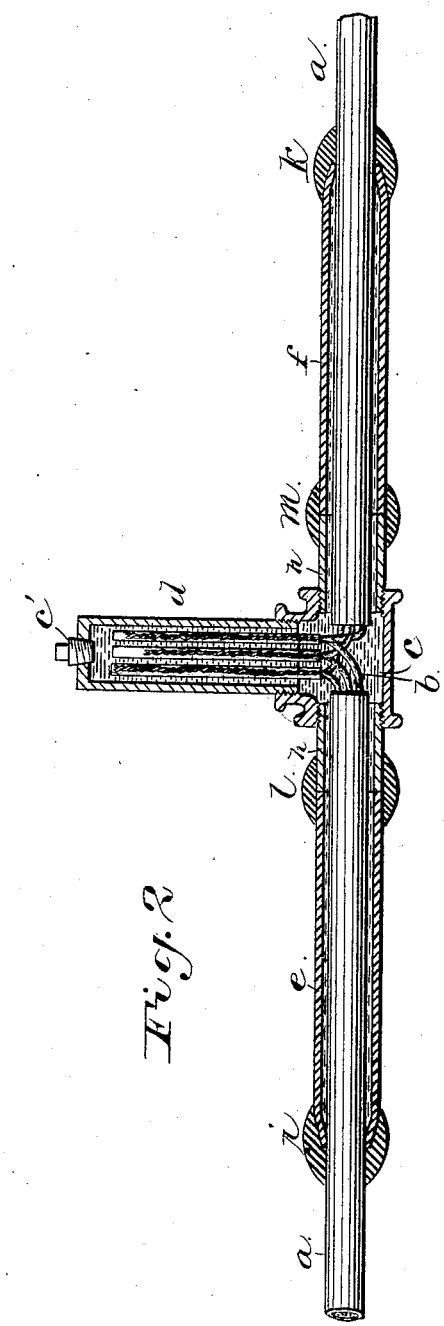

Figures 1 and 2 are illustrative of my invention.

*a* is the cable, consisting of a flexible metallic pipe containing a core of insulated conductors *b b*. The wires of the conductors are covered with a fibrous material, and the interstices among the conductors, and between them and the lead pipe, are filled with paraffine or other insulating material in any of the well-known ways. In order to form a perfect splice, the corresponding wires of the two pieces of cable must be united, and the different joints of the wires must be insulated and fully protected.

The metallic covering consists of the T-shaped piece, the cap *d*, and the sleeves *e* and *f*. The outer ends of the sleeves should be of lead, while the parts *h h* should be of harder metal, preferably brass. The T-shaped piece *c* must be of hard metal, like brass or iron, and the cap *d* may be of iron.

In order to unite two pieces of cable, I first cut away the lead pipe, so that the wires may project a short distance. I then slip the sleeves *e f* over the two ends of the cable and screw the said sleeves into the T-piece, as shown, bringing the projecting ends of the wires through the outlet of the T-piece. The bare ends of the wires are then twisted together, and the joints thus formed covered with glass tubes, as shown in Patent No. 233,162, granted me October 12, 1880. I then wipe joints *i k*. These joints must be far enough from the ends of the cable so that the paraffine which is melted by the heat may not run out, so as to come into contact with the solder. I make the sleeves, therefore, of considerable length, as shown. The outer ends of the sleeves are first compressed about the lead pipe of the cable, and the joints are then wiped in the usual manner. After the cap *d* is inserted I remove the screw-plug *c'*, and then turn or force in melted paraffine or other melted insulating substance.

If the paraffine is quite hot, it is not necessary to use pressure. I prefer, however, to attach a force-pump to the opening in the cap and put on enough pressure to test the joints *i k* of the splice.

The joints *l m* of the sleeves are made in the shop, and hence may be relied on. The screw-joints may be made perfect, if the threads are cut with care. The joints *i k*, however, must be made in the trench, and are therefore less reliable. The paraffine, however, between the pipe of the cable and sleeves keeps out all moisture though joints *i k* should be somewhat imperfect. The sleeves of the splice of an inch and a quarter cable should be about eighteen inches each in length. For smaller cables, where less heat is required in making the joints, the sleeves may be shorter. Sufficient length to allow the joints to be wiped without danger of mixing the melted paraffine with the solder is all that is required.

Having thus described my invention, what

I claim as new and original, and desire to secure by Letters Patent, is—

1. The combination, with the joints of the wires and the lead pipe of a telegraph-cable, of a metallic covering, the outer ends of which are adapted to be compressed about and joined to the pipe, the portions h being of harder metal, like brass, and adapted to screw into the central piece, and a filling of paraffine or other insulating substance which solidifies when cool, whereby the space between the pipe and the covering is filled and the joints protected, as and for the purpose specified.

2. The combination of two metallic sleeves united to the lead pipe of a telegraph-cable, a T-piece joining said sleeves, a cap connected to the outlet of said T, the joints of the conductors, and a filling of insulating substance, substantially as and for the purpose set forth.

3. The combination, with the joints of the conductors of a telegraph-cable, of a T, through which the said conductor-joints project, a cover adapted to screw into said outlet, over said conductor-joints, and two sleeves, each of which is at one end adapted to screw into said T, and at the other end adapted to be soldered to the metallic pipe of the cable, said sleeves being extended for a considerable distance over said pipe, whereby the insulator melted in said pipe by the soldering process is prevented from running out at the ends of said pipe, substantially as specified.

4. A splice for lead pipe telegraph-cables, consisting of two metallic sleeves joined by a T, said sleeves being extended over and joined to the lead pipe of the sections of the cable to be joined, in combination with the joints of the electrical conductors, said conductors being extended through the outlet of the said T, and covered by a cap connected to the outlet of said T, substantially as set forth.

In witness whereof I hereunto subscribe my name this 9th day of October, A. D. 1882.

WILLIAM R. PATTERSON.

Witnesses:
P. A. STALEY,
GEORGE P. BARTON.